United States Patent Office

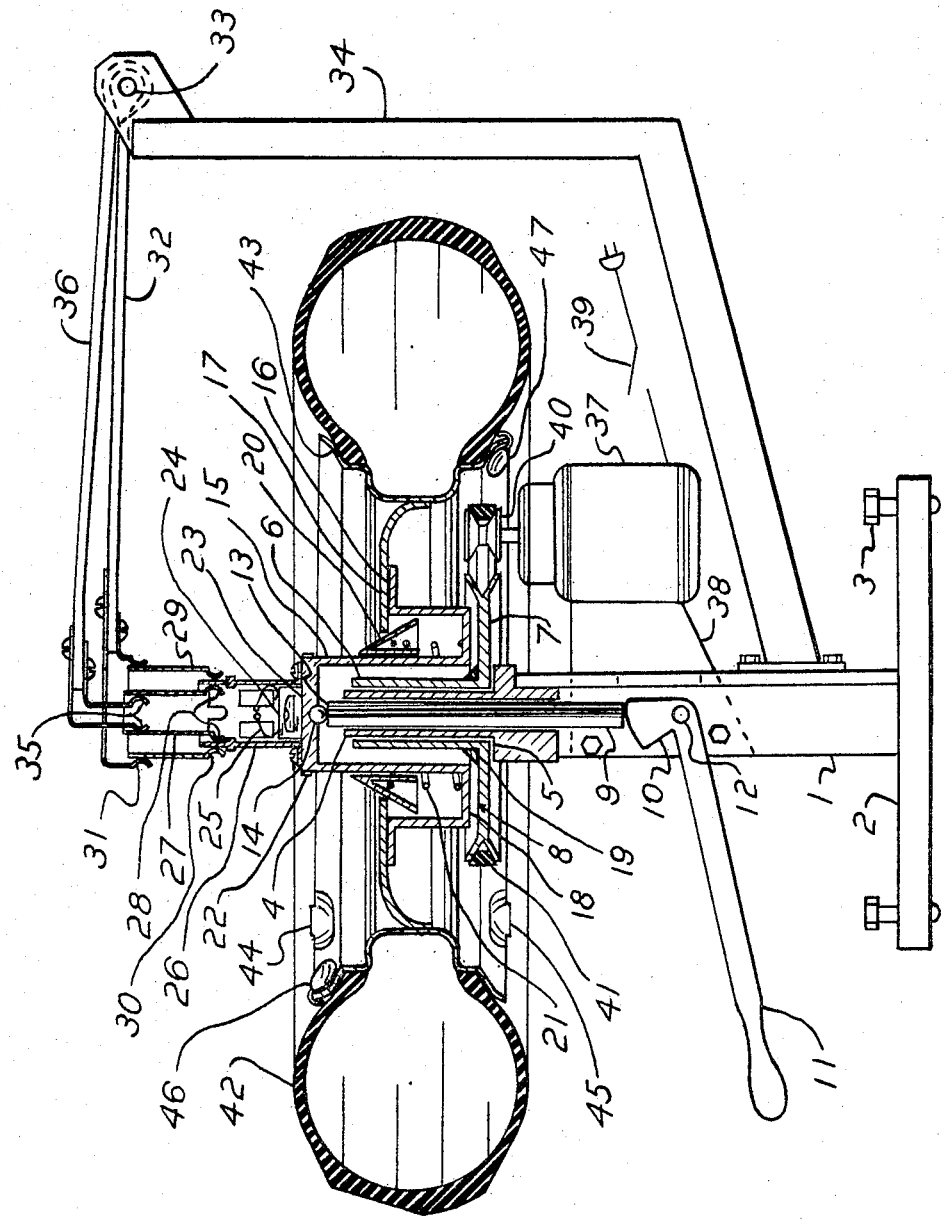

3,435,686
Patented Apr. 1, 1969

3,435,686
DYNAMIC WHEEL BALANCER
Cloyd D. Waldron, 1308 Willow Lane,
Mobile, Ala. 36605
Continuation of application Ser. No. 382,039, July 13, 1964. This application Mar. 27, 1967, Ser. No. 626,346
Int. Cl. G01m *1/28*
U.S. Cl. 73—460                                                                 9 Claims

ABSTRACT OF THE DISCLOSURE

A machine that balances wheels dynamically by spinning them steadily and freely on a ball bearing against a plane. Tilt caused by dynamic unbalance is recorded by a friction restrained indicator on the wheel carrying element that is tilted by an arm on the machine frame. A second zero reference indicator associated therewith permits the reading of small angles of tilt.

---

This is a continuation of application Ser. No. 382,039 filed July 13, 1964.

This invention relates to the dynamic balancing of wheels, with particular application to the balancing of automobile wheels with tires.

The type of wheel-tire balancer most commonly in use is a static balancer in which the wheel and tire are supported on a central pivot. Equal weights are attached to the inside and the outside of the wheel at the same angular location of the wheel until the plane of the wheel is level when resting on the pivot.

When the unbalance of the wheel and tire is caused by wear which is not equally distributed about the center of the tread, or when a tire has become distorted on one side of the center of the tread, or has been recapped and the tire is thicker on one side of the center of the tread, the wheel will try to wobble when turning, even though weights have been added so that the tire and wheel are in perfect static balance. This wobbling of a front wheel on an automobile swings the spindle forward and backward during each revolution, giving a vibration similar to that caused by static unbalance. To correct this wobbling tendency the equivalent of two equal weights of the proper size and in the proper location must be attached to the wheel, one weight on the outside of the wheel, and the other weight 180° from the first weight and on the inside of the wheel.

A simple static balancer can give no information about the size or location of the two weights that must be attached 180° apart on the wheel for counteracting the wobble tendency. The invention described herein not only supports a wheel in a level position on a central pivot for static balancing, but also rotates the wheel freely on the central pivot so that it can wobble in the direction caused by the dynamic unbalance. An indicator shows the direction and amount that the wheel wobbled during rotation, showing the location of the weights that must be added 180° apart. Trial and error will show the size of the weights which must be added. Thus, with this invention a wheel can quickly be balanced statically in the conventional manner; and with a few rotations and 180° weight addition trials the wheel can be balanced dynamically. The wheel then will spin freely on its central pivot with no wobble caused by dynamic unbalance.

The drawing is a cross section of one form of the invention.

The drawing shows a pedestal 1, with legs 2, which have leveling screws 3. To the top of pedestal 1 is attached a vertical sleeve 4 which has a supporting shoulder 5. Parts 4 and 5 support and hold sleeve 6 vertical and centered about 4 so that sleeve 6 can rotate. Sleeve 6 is attached to pulley 7 which has a level surface 8. Located inside sleeve 4 is a rod 9 which has a free sliding fit with the inside of 4. Rod 9 is raised and lowered by a cam 10 which has a handle 11 and a shaft 12. The top surface 13 of rod 9 is flat, smooth, hard and level. 14 is a ball which rests on surface 13 when rod 9 is raised. Ball 14 does not contact surface 13 when rod 9 is lowered. Ball 14 is attached to and centered with a wheel supporting member 15. Member 15 has a flat surface 16 on which a wheel 17 can rest. Member 15 has a flat surface 18 which is parallel to surface 16, and which rests on the level surface 8 of pulley 7 when rod 9 is lowered. Sleeve 6 and pulley 7 have a support centering cone 19 which centers support 15 when rod 9 is lowered so that ball 14 is above the center of surface 13. Member 15 carries a wheel centering conical member 20, which with a spring 21 causes wheel 17 to center with respect to ball 14 when the wheel is placed on member 15. Member 15 has a flange 22 which serves as a stop for the upward travel of cone 20. Member 15 has a flat surface 23 which is parallel to the wheel supporting surface 16. Carried on surface 23 is a level 24 which has a spherical upper inner surface so as to show when surface 23 is level in all directions. Spring clips 25 in sleeve 26, which is attached to member 15, keep level 24 pressed against surface 23. Sleeve 27 is tiltably carried by sleeve 26 by means of pressure and friction between spring clips 28 and sleeve 26. Clips 28 are rigidly attached to sleeve 27. Sleeve 29 is tiltably carried by sleeve 26 by pressure and friction from spring clips 30. Clips 30 are rigidly attached to sleeve 29. Adjustable fingers 31 on arm 32 center sleeve 29 with respect to the axis of rotation of pulley 7 and sleeve 6. A small amount of clearance exists between fingers 31 and sleeve 29 so that friction is low. Arm 32 swings about shaft 33 in bracket 34 which attaches to pedestal 1. Adjustable fingers 35 which are attached to arm 36 center sleeve 27 with respect to the axis of revolution of pulley 7 and sleeve 6. Fingers 35 have a small amount of clearance with sleeve 27 so that friction is low. Arm 36 swings about shaft 33. Part 37 is a geared down motor attached to pedestal 1 by bracket 38. Switch 39 starts and stops the motor. A pulley 40 on motor 37 drives pulley 7 by means of belt 41. Tire 42 is mounted on rim 43 of wheel 17. Equal weights 44 and 45 are attached at the same angular location on the inside and the outside of rim 43 for static balancing. Equal weights 46 and 47 are attached 180° apart on rim 43, one weight on the inside of the wheel and one weight on the outside of the wheel, for dynamic balancing.

In the operation of balancing a wheel statically handle 11 is raised so that cam 10 lowers rod 9 until surface 13 does not contact ball 14, and surface 18 of member 15 rests on surface 8 of pulley 7. Screws 3 are adjusted until level 24 shows that surface 23 is level, which means that surface 13 is level. After this a wheel and tire are placed on members 15 and 20. Sleeves 27 and 29 are centered by fingers 31 and 35, after which arms 32 and 36 are swung 270° around shaft 33. Sleeves 27 and 29 and arms 32 and 36 then are left in these positions during the static balancing process. Handle 11 is pressed downward so that cam 10 raises rod 9 until surface 13 lifts ball 14, so that member 15 does not touch support centering cone 19 or pulley 7. In this condition member 15, the wheel 17 and tire 42 can tilt freely on ball 14. If the level 24 does not show the wheel to be level, rod 9 is lowered and weights 44 and 45 are attached. Rod 9 is raised again and the degree of levelness observed. This process is repeated until the proper size and location of weights 44 and 45 are attached, and level 24 shows that it is level when rod 9 is raised. The wheel now is in static balance.

After the wheel and tire are balanced statically the first stage of the dynamic balancing process is to raise handle 11 until member 15 rests on pulley 7. Motor 37 is started. Arm 32 is swung counterclockwise until fingers 31 center sleeve 29. Arm 36 is swung counterclockwise until fingers 35 center sleeve 27, after which arm 36 is swung 270° clockwise.

The second stage in the dynamic balancing process is to press handle 11 downward rather briskly so that cam 10 raises rod 9 to its uppermost position, in which position the wheel 17, tire 42, support 15 and sleeves 26, 27 and 29 rotate freely with ball 14 resting on surface 13, and with support 15 clearing wheel 7 and cone 19, so that the wheel 17, tire 42 and support 15 can tilt from the vertical axis of rotation in any direction. In this stage fingers 31 prevent sleeve 29 from moving away from the vertical axis of rotation. In this stage, if the wheel and tire are dynamically unbalanced, sleeve 29 acquires a slight angular position with respect to sleeve 26 so that the top end of sleeve 29 is not concentric with the top end of sleeve 27.

In the third stage, immediately after rod 9 has risen and the axis of rotation of wheel 17 has tilted away from vertical, arm 32 is swung upward quickly so that fingers 31 no longer contact sleeve 29. The reason for the need for rapidity in raising rod 9 and arm 32 is that soon after starting to spin freely on ball 14, the axis of wheel 17, tire 42 and member 15 will start to precess. Fingers 31 must be removed from around sleeve 29 before appreciable precession has occurred.

In the fourth stage, with motor 37 still running, rod 9 is lowered so that support 15 again rests on pulley 7. Switch 39 is opened and the wheel and motor allowed to coast to a stop. Rod 9 is lowered with motor 37 still running so that wheel 17 does not skid on surface 16 when rod 9 is lowered, which would change the rotational angular relation between tire 42 and sleeves 27 and 29. This change in angular relation would cause sleeves 27 and 29 to give an incorrect indication of the direction in which the rotational axis of wheel 17 departed from vertical when spinning freely on ball 14.

The fifth stage in the dynamic balancing process is to add a weight 46 to the top side of the wheel rim at the angular position on the wheel at which the annular space between sleeves 27 and 29 is greatest. An equal weight 47 is added to the bottom side of the rim 180° of wheel rotation from weight 46.

The seventh stage is to repeat stages one through four and see if sleeve 29 remains concentric with sleeve 27. If they do remain concentric the wheel is in dynamic balance. If they do not remain concentric the size of weights 46 and 47 must be changed until sleeves 27 and 29 do remain concentric when stages one through four are repeated, in which condition the tire and wheel are in dynamic balance.

I claim:

1. A machine for dynamically balancing wheels and the like comprising a power driven first member having a first rotational axis, a thrust bearing carried by said machine for rotatively supporting said first member, a first surface on said first member disposed in a plane normal to said first rotational axis for supporting a vertical load, means for making said first rotational axis vertical, a rotatable wheel supporting second member on which wheels can be placed with the rotational gometric axis of the wheel coinciding with a second rotational axis of said second member, means carried by said second member to indicate when said second rotational axis is vertical, said second member being formed with a non-flat second surface that is a surface of revolution about said second rotational axis, said second member having a third surface disposed in a plane normal to said last mentioned axis and which is engageable with said first surface of said first member for supporting said second member on said first member, said machine having a third member provided with a fourth surface at its upper end, said fourth surface being disposed in a plane normal to said first rotational axis, said second member and said third member being formed so that contact between said second surface and said fourth surface is disposed above the center of gravity of said second member and its supported elements, said fourth surface and said second surface having shapes that allow said second rotational axis to tilt when said third member supports said second member, said first, second and third members being shaped to permit said second member to freely tilt with its supported wheel when said second member is supported by said third member, means for moving said second member from either a position in which said second member is supported solely by said first member or where said second member is supported solely by said third member, and indicator means carried by said second member for showing after rotation has stopped, the amount of tilt of the second rotational axis of said second member from the first rotational axis and true verticalness.

2. A machine for dynamically balancing wheels and the like as defined in claim 1 wherein said non-flat second surface of said second member is a convex surface and downwardly disposed.

3. A machine for dynamically balancing wheels and the like as defined in claim 1 wherein said means to move said second member into either of said two positions comprises means for moving said third member along a vertical axis.

4. A machine for dynamically balancing wheels and the like as defined in claim 1 wherein the means carried by said second member to indicate when said second rotational axis is vertical comprises a bubble type spherical level mounted on a surface of said second member that is normal to said second rotational axis.

5. A machine for dynamically balancing wheels and the like as defined in claim 1 wherein said indicator means carried by said second member for indicating the amount of tilt of the rotational axis of said second member comprises a fourth member mounted on said second member and angularly movable with respect thereto under the influence of rotational forces when spinning of the second member takes place, said fourth member having a fifth surface that can be made concentric with said first rotational axis and frictionally engaging means between said second and said fourth members tending to resist angular movement therebetween.

6. A machine for dynamically balancing wheels and the like as defined in claim 5 wherein a fifth member is carried by said machine and movably mounted thereon so as to be movable into a position to bear against said fifth surface to effect concentricity thereof with said first rotational axis and can be moved away from said position.

7. A machine for dynamically balancing wheels and the like as defined in claim 6 including a sixth member carried by said second member and angularly movable with respect thereto and with respect to said fourth member, said sixth member having a sixth surface that can be made concentric with said first rotational axis and means carried by said machine for effecting said concentricity.

8. A machine for dynamically balancing wheels and the like as defined in claim 7 wherein said sixth member and said second member are provided with frictional engaging means tending to resist angular movement therebetween, said machine having a seventh member movable into position to bear against said sixth surface to effect said concentricity of said sixth surface.

9. A machine for dynamically balancing wheels and the like as defined in claim 1 wherein means are provided to move said second rotational axis toward said first rotational axis when said first member and said second member are moved toward each other.

(References on following page)

References Cited

UNITED STATES PATENTS

| | | | |
|---|---|---|---|
| 2,134,500 | 10/1938 | Bennett | 73—474 |
| 2,170,848 | 8/1939 | Bennett | 73—459 |
| 2,211,779 | 8/1940 | Holmes | 73—474 |
| 2,553,058 | 5/1951 | Martin | 73—459 |
| 2,968,185 | 1/1961 | Jacobsen | 73—459 |
| 3,164,996 | 1/1965 | Carrigan | 73—483 |
| 189,506 | 4/1877 | Seymour | 73—474 |
| 1,253,987 | 1/1918 | Lewis | 73—474 XR |
| 2,134,500 | 10/1938 | Bennett | 73—474 |
| 2,378,018 | 6/1945 | Inman | 73—459 XR |
| 2,553,058 | 5/1951 | Martin | 73—459 |
| 2,636,382 | 4/1953 | Martin | 73—459 |
| 2,968,185 | 1/1961 | Jacobsen | 73—471 |

FOREIGN PATENTS 898,021  6/1962  Great Britain.

JAMES J. GILL, *Primary Examiner.*

U.S. Cl. X.R.

73—459